United States Patent
Tallam et al.

(10) Patent No.: US 8,710,782 B2
(45) Date of Patent: Apr. 29, 2014

(54) PARALLEL POWER INVERTER MOTOR DRIVE SYSTEM

(75) Inventors: Rangarajan M. Tallam, Germantown, WI (US); Russel J. Kerkman, Milwaukee, WI (US); Richard H. Radosevich, Waukesha, WI (US); Alan J. Campbell, New Berlin, WI (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 134 days.

(21) Appl. No.: 13/482,669

(22) Filed: May 29, 2012

(65) Prior Publication Data
US 2012/0235614 A1 Sep. 20, 2012

Related U.S. Application Data

(63) Continuation of application No. 12/837,931, filed on Jul. 16, 2010, now Pat. No. 8,188,694.

(51) Int. Cl.
*H02P 27/00* (2006.01)

(52) U.S. Cl.
USPC .......................... 318/400.3; 318/434; 318/802

(58) Field of Classification Search
USPC .............. 318/400.3, 434, 802, 800, 811, 803; 363/69, 70
See application file for complete search history.

(56) References Cited

U.S. PATENT DOCUMENTS

| | | | |
|---|---|---|---|
| 4,349,772 A * | 9/1982 | Weiss | ........................... 318/799 |
| 5,460,244 A | 10/1995 | Tanahashi | |
| 6,611,412 B1 | 8/2003 | Reichwein | |
| 2005/0253165 A1 | 11/2005 | Pace et al. | |

* cited by examiner

*Primary Examiner* — Karen Masih
(74) *Attorney, Agent, or Firm* — Fletcher Yoder, P.C.; Alexander R. Kuszewski; John M. Miller

(57) ABSTRACT

Multiple inverter motor drives are interconnected in parallel to provide a common output to a motor. Common control circuitry is coupled to all parallel drives via optical cables and provides signals to power layer circuitry of each inverter for generation, at the power layer, of timing for gate drive signals for the respective inverter power electronic switches. The resulting timing exhibits a high degree of synchronicity such that very little imbalance occurs in the outputs of the paralleled drives, resulting in very low circulating currents.

20 Claims, 7 Drawing Sheets

PARALLEL POWER INVERTER MOTOR DRIVE SYSTEM

CROSS-REFERENCE TO RELATED APPLICATIONS

This application is a continuation of application Ser. No. 12/837,931, filed Jul. 16, 2010, entitled "Parallel Power Inverter Motor Drive System" in the name of Rangarajan M. Tallam et al.

BACKGROUND

The invention relates generally to the field of power conversion devices and more particularly to inverters and their control.

Large number of topographies and types of power conversion circuits are know and are in use. Many of these circuits rely upon inverter topologies for converting direct current (DC) power to control frequency alternating current (AC) power. In many topologies a rectifier or other converter is provided to receive incoming AC power, typically from the grid, and to convert the AC power to DC power that is applied to a DC bus used to feed the inverter circuitry. Such topologies are used in a variety of applications, such as for controlling the speed and operating characteristics of motors.

Motor drives utilizing inverter topologies often employ a single converter and single inverter coupled to one another by a single DC bus. Conventional inverters are formed by solid state switches provided in pairs and alternately switched between conducting and non-conducting states to provided desired output waveforms, typically of controlled frequency. Such topologies are adequate for many smaller applications, and may vary in size depending upon the power rating, frame size, voltage, and other specifications of the driven motor. However, for larger motors the components of such drives become proportionally large and expensive. It becomes attractive, then, to use alternative topologies in which multiple inverters are provided in parallel, with their outputs being joined to provide a common AC output to a load.

Such parallel inverter applications pose unique difficulties. For example, because the outputs of the inverters are essentially shorted to one another, various magnetic structures may be required to prevent circulating currents from being established due to mismatched timing in the switching of the power electronic switches in the inverters. For example, if switches in a first inverter are switched in a manner that is not sufficiently synchronized with switches of a parallel inverter, output power can be allowed to re-enter one or the other of the inverters due to the conductive states of the switches. Moreover, because the switching frequencies of such inverter components is quite high, a high degree of precision will be required to prevent such circulating currents absent magnetic structures of the type used in the art. Sufficiently precise switching topologies have yet to be proposed.

BRIEF DESCRIPTION

The present invention provides techniques for driving inverter switches designed to response to such needs. In accordance with one aspect of the present technique, an electric motor drive system comprises a plurality of drive modules each comprising a converter for converting incoming AC power to DC power and an inverter coupled to the converter for converting the DC power to controlled frequency AC power, and a shared line-side bus coupled to the converters of the drive modules for providing the incoming AC power. A shared load-side bus is coupled to the inverters for combining the controlled frequency AC power from all of the drive modules into a common AC output. A common controller coupled to all of the inverters and configured to provide signals to the inverters to permit each inverter to generate gate drive signals for power electronic switches of the respective inverter separately and in parallel with one another.

In accordance with another aspect of the invention, an electric motor drive system comprises a plurality of drive modules each comprising a converter for converting incoming AC power to DC power and an inverter coupled to the converter for converting the DC power to controlled frequency AC power. A common controller is coupled to all of the inverters and configured to provide signals to the inverters to permit each inverter to generate gate drive signals for power electronic switches of the respective inverter separately and in parallel with one another. A shared line-side bus is coupled to the converters of the drive modules for providing the incoming AC power, and a shared load-side bus is coupled to the inverters for combining the controlled frequency AC power from all of the drive modules into a common AC output without interposition of inductive components therebetween. Each inverter comprises power layer processing circuitry that, during operation, receives the signals from the common controller and generates timing for the gate drive signals based upon the received signals.

In accordance with another aspect of the invention, an electric motor drive system comprises a plurality of drive modules each comprising a converter for converting incoming AC power to DC power and an inverter coupled to the converter for converting the DC power to controlled frequency AC power, and a common controller coupled to all of the inverters and configured to provide signals to the inverters to permit each inverter to generate gate drive signals for power electronic switches of the respective inverter separately and in parallel with one another. A shared line-side bus is coupled to the converters of the drive modules for providing the incoming AC power and a shared load-side bus is coupled to the inverters for combining the controlled frequency AC power from all of the drive modules into a common AC output without interposition of inductive components therebetween. Each inverter is coupled to the common control circuitry via a respective optical cable and comprises power layer processing circuitry that, during operation, receives the signals from the common controller via the respective optical cable and generates timing for the gate drive signals based upon the received signals, the timing of the gate drive signals of any two of the inverters differing from one another by not more than 40 ns.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
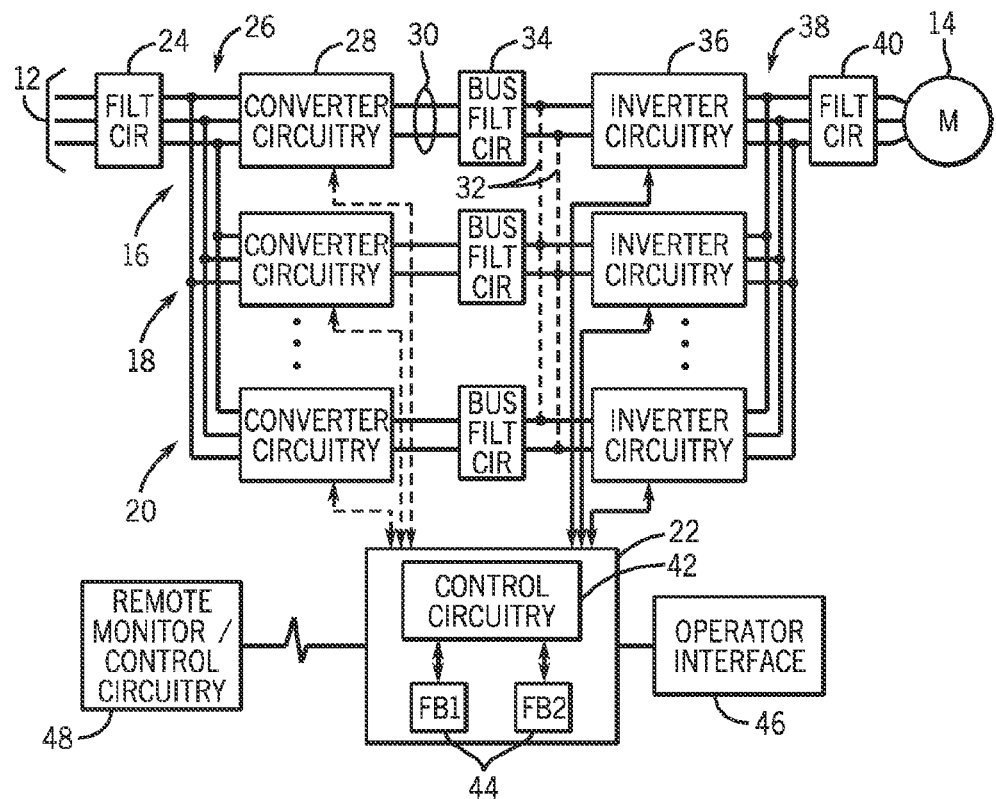
FIG. 1 is a diagrammatical representation of a motor drive system in accordance with certain aspects of the present disclosure.

FIG. 1 represents a drive system 10 in accordance with aspects of the present disclosure. The drive system is configured to be coupled to a source of AC power, such as the power grid, as indicated by reference numeral 12, and to deliver conditioned power to a motor 14 or any other suitable load. The system 10 comprises a plurality of individual drives coupled to one another in parallel to provide power to the load. In the example illustrated in FIG. 1, for example, a first drive 16 is illustrated as coupled to a second drive 18 and a further drive 20 which may be the third, fourth, fifth or any suitable terminally numbered drive. A presently contemplated embodiment may accommodate up to 5 parallel drives, although fewer or more may be configured in the same way. It should be noted that certain aspects of the techniques described herein may be used with a single drive. However, other aspects are particularly well-suited for multiple parallel drives.

A controller 22 is coupled to the circuitry of each drive and is configured to control operation of the circuitry as described more fully below. In a presently contemplated embodiment, the controller may be housed in one of the drives or in a separate enclosure. Appropriate cabling (e.g., fiber optic cabling) is provided to communicate control and feedback signals between the controller and the circuitry of the individual drives. The controller will coordinate operation of the drives to ensure that the provision of power is shared and that operation of the drives is synchronized sufficiently to provide the desired power output to the motor. In the embodiment illustrated in FIG. 1, power filtering circuitry 24 may be provided upstream of the motor drives. Such circuitry may be provided upstream of a line-side bus 26 or similar circuitry may be provided downstream of the bus in each of the drives. Such circuitry may include inductors, capacitors, circuit breakers, fuses, and so forth that are generally conventional in design and application.

The power bus 26 distributes three phases of AC power between the individual drives. Downstream of this bus, each drive includes converter circuitry 28 that converts the three phases of AC power to DC power that is applied to a DC bus 30. The converter circuitry 28 may be passive or active. That is, in a presently contemplated embodiment non-gate driven circuitry alone is used to define a full wave rectifier that converts the incoming AC power to DC power that is applied to the bus. In other embodiments the converter circuitry 28 may be active or gate driven, including controlled power electronic switches that are switched between conducting and non-conducting states to control the characteristics of the DC power applied to the bus.

Continuing with the components of each drive, bus filtering circuitry 34 may be provided that conditions the DC power conveyed along the DC busses 30. Such filtering circuitry may include, for example, capacitors, inductors (e.g., chokes), braking resistors, and so forth. In some embodiments common devices may be provided on the DC busses, which may be coupled to one another by links illustrated by reference numeral 32.

Each drive further includes inverter circuitry 36. As will be appreciated by those skilled in the art, such circuitry will typically include sets of power electronic switches, such as insulated gate bipolar transistors (IGBTs) and diodes arranged to allow for converting the DC power from the bus to controlled frequency AC output waveforms. The inverters thus create three phases of controlled frequency output, with each phase being shorted or combined along an output bus 38. The combined power may be applied to output filtering circuitry 40, which may include magnetic components that couple the output power between the phases. Such circuitry may also be provided along the load-side bus 38.

The controller 22 will typically include control circuitry 42 that is configured to implement various control regimes by properly signaling the inverter circuitry (and, where appropriate, the converter circuitry) to control the power electronic switches within these circuits. The control circuitry 42 may, for example, include any suitable processor, such as a microprocessor, field programmable gate array (FPGA), memory circuitry, supporting power supplies, and so forth. In motor drive applications, the control circuitry may be configured to implement various desired control regimes, such as for speed regulation, torque control, vector control, start-up regimes, and so forth. In the embodiment illustrated in FIG. 1, various functional circuit boards 44 are linked to the control circuitry and may be provided for specific functions. For example, a wide range of options may be implemented by the use of such circuitry, including the control regimes mentioned above, as well as various communications options, safety options, and so forth.

The controller will typically allow for connection to an operator interface, which may be local at the controller and/or remote from it. In a presently contemplated embodiment, for example, an operator interface 46 may be physically positioned on the controller but removable for hand-held interfacing. The interface circuitry (e.g., portable computers) may also be coupled permanently or occasionally to the controller, such as via Internet cabling, or other network protocols, including standard industrial control protocols. Finally, the controller may be coupled to various remote monitoring and control circuitry as indicated by reference numeral 48. Such circuitry may include monitoring stations, control stations, control rooms, remote programming stations, and so forth. It should be noted that such circuitry may also include other drives, such that the operation of the system 10 may be coordinated, where desired, with that of other equipment. Such coordination is particularly useful in automation settings where a large number of operations are performed in a coordinated manner. Thus, the control circuitry 42 may form its control in coordination with logic implemented by automation controllers, separate computers, and so forth.

Figure 2:
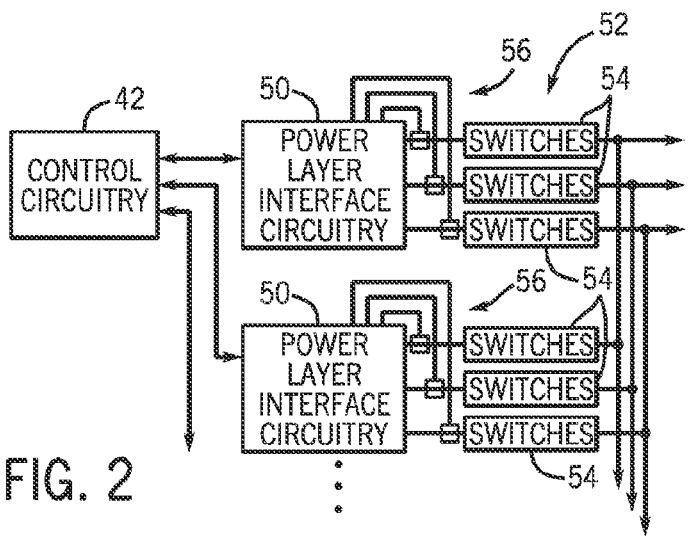
FIG. 2 is further diagrammatical representation of a portion of the system of FIG. 1 illustrating power layer interface circuitry used in the multiple parallel motor drives.

FIG. 2 illustrates certain of the components that may be included within the individual drives described above. For example, the control circuitry 42 is illustrated as being coupled to power layer interface circuitry 50. Such circuitry will be provided in each drive and will operate independently within the drive, but in a coordinated manner under the control of the control circuitry. The power layer interface circuitry may include a range of circuits, such as a dedicated processor, memory, and so forth. In a presently contemplated embodiment, the power layer interface circuitry 50 includes an FPGA that implements programming for carrying out control of the power electronic switches within the individual drive. The power layer interface circuitry thus communicates with the power layer as indicated by reference numeral 52 which is itself comprised of sets of power electronic devices, such as IGBTs and diodes. These switches are illustrated generally by reference numeral 54. In a typical arrangement, the switches may be provided on a single support or on multiple supports. For example, in a presently contemplated embodiment separate supports are provided for each phase of power, with multiple IGBTs and diodes being provided on each support. These devices themselves may be constructed in any suitable manner, such as direct bond copper stacks, lead frame packages, and so forth. In general, one or several types of feedback will be provided in the circuitry as indicated by reference numeral 56. Such feedback may include, for example, output voltages, output currents, temperatures, and so forth. Other feedback signals may be provided throughout the system, such as to allow the control circuitry to monitor the electrical parameters of the incoming power, the outgoing power, the DC bus power, and so forth.

The structure and operation of the control circuitry may be substantially similar to those described in U.S. published patent application no. 20100123422, entitled "Motor Controller with Deterministic Synchronous Interrupt having Multiple Serial Interface Backplane," filed by Campbell et al. on Nov. 17, 2008, which is hereby incorporated into the present disclosure by reference.

Figure 3:
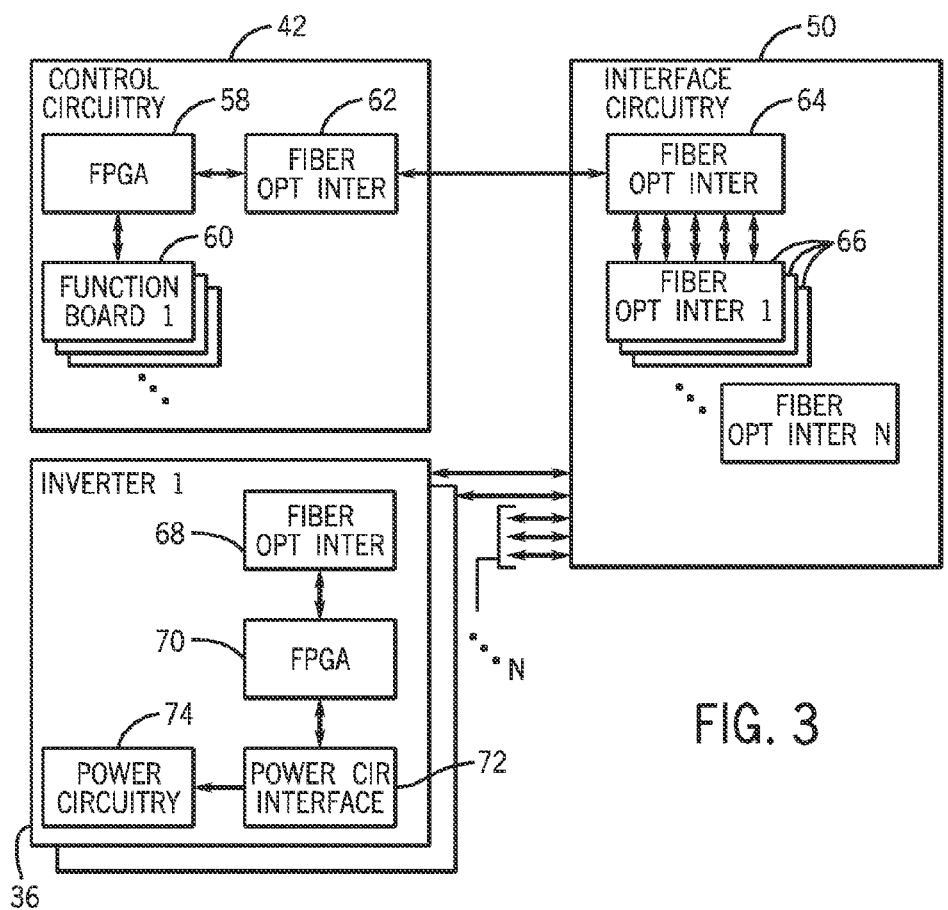
FIG. 3 is a diagrammatical representation of certain functional circuits and data exchange devices for communicating between control circuitry and power circuitry in accordance with aspects of the present technique.

FIG. 3 illustrates an exemplary manner in which certain functional components of the individual drives may be coupled to provide coordinated operation of the drives within the system. As shown in FIG. 3, the control circuitry 42 is coupled to the inverter circuitry 36 by the intermediary of optical interfaces. As indicated above, the control circuitry will include any suitable processing circuitry, such as an FPGA 58 in the embodiment illustrated in FIG. 3. This FPGA may include its own memory or separate memory may be provided (not shown). As also mentioned above, the FPGA 58 may perform various functions in cooperation with various function boards as indicated by reference numeral 60. The FPGA communicates with the various inverters by a fiber optic interface 62 which communicates with a mating fiber optic interface 64. This interface distributes signals to series of fiber optics interfaces 66 for the individual drives. These components, in turn, communicate with a fiber optic interface 68 at the power level of each inverter. The circuitry at the power level will typically include a further FPGA 70 which may be provided on a common support (e.g., circuit board) with a power circuit interface 72. The support, which may be the present context termed the power layer interface, serves to receive signals from the control circuitry, to report signals back to the control circuitry, to generate drive signals for the power electronic switches, and so forth. The circuitry may also perform certain tests functions, such as to verify the one or more drives can be disabled when desired. The power circuit interface 72 may convert control signals to drive signals for driving the power circuitry as indicated generally by reference numeral 74. The power circuitry 74 will include the power electronic switches as described above.

It should be noted that in certain embodiments signal transmission between the control circuitry and the power layer circuitry may be performed over conductors other than optical fibers. For example, conventional copper or other conductors may be utilized. In such cases, the fiber optic interface discussed in connection with FIG. 3 may be omitted, and the control circuitry coupled directly to the power layer circuitry.

Figure 4:
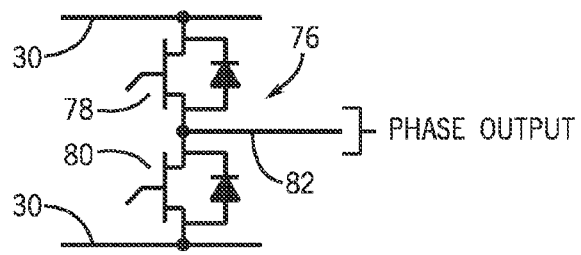
FIG. 4 is a schematic view of power electronics switches within one phase of an inverter.

The particular functions of the power layer circuitry in the present context include the generation of gate drive signals based upon signals provided by the control circuitry 42. That is, rather than providing gate drive signals directly from the control circuitry 42, the circuitry described herein allows for certain data to be provided to the power layers of each drive, and based upon a clock running for the FPGA in the power layer circuitry, timing signals can be generated or computed in parallel within each power layer. The timing signals serve to generate gate drive signals for the power electronic devices which will typically be arranged as illustrated in FIG. 4. That is, each phase of each inverter will include sets of switches as indicated by reference numeral 76, notably a high-side switch 78 and low-side switch 80. These power switches are coupled across the DC bus 30 and an output 82 is coupled between the high and low-side switches. The coordinated switching of the switches between conducting and non-conducting states allows for generation of a controlled output waveform on the output line 82. In practice, a number of such switches may be provided on a common support and coupled to one another to provide the desired power capacity.

Figure 5:
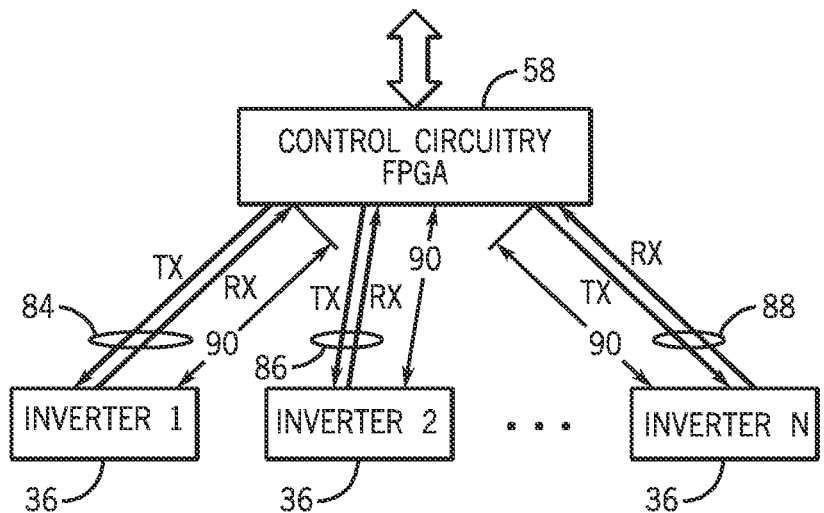
FIG. 5 is a diagrammatical view of the interchange of data between control circuitry and power layer circuitry.

FIG. 5 is a diagrammatical representation of the topology of the parallel drives and of the communications between the drives contemplated for establishing the gate drive signals for the power electronic devices at the power layer. In particular, the control circuitry FPGA 58 will provide certain data along a first, transmitting (TX) optical fiber and receive data via a second, parallel receiving (RX) optical fiber. A similar optical fiber pair indicated by reference numerals 84, 86 and 88 is provided for each inverter. The optical fiber pair transmits data and receives data in parallel for each of the inverters, such that the power layer interface circuitry within each of the inverters, and in particular the processor associated with this circuitry can recompute clock or timing information from the control circuitry FPGA without the need for the clock data being transmitted to the inverters. In a presently contemplated embodiment the lengths 90 of these optical pairs are substantially equal to reduce differences performance due to the propagation of the signals between the control circuitry and the power layer circuitry.

As will be appreciated by those skilled in the art, because the outputs of the inverters are essentially shorted, differences in switching and switch timing between the power layers of each inverter can cause circulating currents that are generally to be avoided. The arrangement illustrated in FIG. 5 and described in greater detail below allows for maintaining tight tolerances in the switching timing between the inverters, such as on the order of 20-40 ns. In a presently contemplated embodiment, data sent from the control board FPGA to the power layers of each inverter include a control status, a carrier wave increment, a deadtime value, and U, V, and W (output) phase compare values. Data provided by each power layer back to the control board FPGA includes the bus voltage, temperature, a fault status, and U, V, and W phase currents. As described below, based upon the information provided to each power layer, gate drive signals may be generated in parallel that are inherently synchronized without the overhead of transmitting a clock signal. That is, the FPGA of each power layer, operating in accordance with its own oscillator and clock, can accurately generate or recomputed timing for gate drive signals for the switches of the individual inverter in synchronicity with those of the other inverters. As described in greater detail with reference to FIGS. 6 and 7, the circuitry works, in a presently contemplated embodiment, by transferring data for synchronization that is imbedded in the data provided along the transmitting optical cable. This data allows for clock data recovery at the power layer. Moreover, a carrier waveform signal is sent from the control circuitry that facilitates the clock data recovery. Finally, a phase comparison is performed by each power layer that, in conjunction with the recovered clock data allows for synchronization of the gate drive signals.

In operation, the control circuitry sends signals to the power layer circuitry of each inverter that permits the power layer circuitry to compute or recompute timing for changing the conductive state of solid state switches in each of the respective inverters. In a presently contemplated embodiment, the computations are based upon reconstruction of a carrier waveform by reference to a recovered clock step and a triangle waveform accumulator. To permit computation or recomputation of the timing, the control circuitry sends a triangle increment signal that allows for reconstruction of the carrier triangle waveform. It also sends compare values for each of the three output phases U, V, and W. Deadtime or delay signals are also sent to allow for avoiding placing high and low switches of each inverter leg in conducting states at the same time (e.g., FIG. 3).

Figure 6:
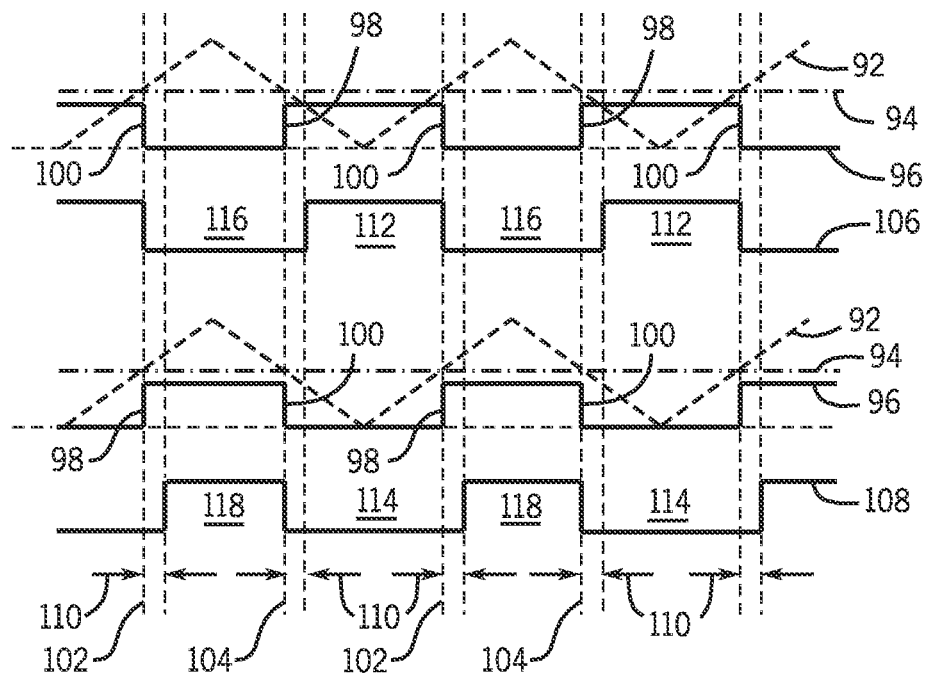
FIG. 6 is a timing diagram illustrating the recreation of gate drive signals within the power circuitry of individual inverters in accordance with aspects of the present techniques.

FIG. 6 represents exemplary timing diagrams for high and low side switches of the type illustrated in FIG. 3 for each inverter leg. It should be noted that such switching is performed for the identical legs of the parallel inverters, and similar switching is performed, although phase shifted, for the other legs of the inverters. It should also be noted that the processes described below are performed at the power layer, unlike existing topologies that may perform similar processing for generating of gate drive timing at the level of the control circuitry. Certain aspects of the computations themselves may be substantially similar to those described in U.S. Pat. No. 5,917,721, entitled "Apparatus for Reducing the Effects of Turn on Delay Errors in Motor Control" and issued to Kerkman et al. on Jun. 29 1999; U.S. Pat. No. 5,990,658, entitled "Apparatus for Controlling Reflected Voltage on Motor Supply Lines" and issued to Kerkman et al. on Nov. 23, 1999; and U.S. Pat. No. 7,738,267, entitled "Systems and Methods for Common-mode Voltage Reduction in AC Drives" and issued to Tallam et al. on Jun. 15, 2010; and U.S. Pat. No. 7,342,380, entitled "System and Method for Adjustable Carrier Waveform Generator" and issued to Kerkman et al. on Mar. 11, 2008, all of which are hereby incorporated into the present disclosure by reference.

As shown in FIG. 6, a triangular carrier wave 92 is recomputed in each of the power layer interface circuits based upon information received from the control circuitry. The rate of change or slope of the triangular carrier waveforms depends upon the step increment for the waveform and a recovered clock signal. Recomputation of the carrier wave signal is discussed below with reference to FIG. 7. The triangular carrier wave is crossed by a phase count line as indicated by reference numeral 94 in FIG. 6. This phase count line allows for the duty cycle of the solid state switches to be altered as it is raised or lowered to change its points of intersection with the carrier wave. Shifting of the vertical location of the phase count 94 is provided by the phase compare values transmitted from the control circuitry to the power layer interface circuitry. The points of intersection lead to computation of phase comparator outputs as indicated by reference numerals 96 in FIG. 6. In FIG. 6, the timing of the upper solid state switch in a pair is illustrated in the upper portion of the diagram, where as timing for a lower solid state switch in a pair is indicated in the lower section of the diagram. It should be noted that for both the upper switch and the lower switch, the comparator output 96 is generally identical but inverted. The intersections of the phase count line and the carrier wave produce rising edges 98 and falling edges 100 in each of these comparator outputs at times 102 and 104, with the rises and falls in the upper and lower switches being opposite to one another.

In the embodiment illustrated in FIG. 6, moreover, deadtimes or delays are taken into account in conjunction with the phase comparator output to produce upper switch drive timing and lower switch drive timing, indicated by reference numerals 106 and 108, respectively. That is, the control circuitry transmits a deadtime or delay signal to the power layer circuitry that causes the OFF or non-conducting period of the upper and lower switches to be extended and the ON or conducting period to be reduced, thereby avoiding placing both switches in a conductive state simultaneously, a condition that could lead to "shoot-through" of current. This delay, indicated in FIG. 6 by reference numeral 110, results in the computed timing providing for periods in which the switches are in conducting and non-conducting states to produce pulse width modulated signals that are applied to the gates of the solid state switches. That is, as shown in FIG. 6, period 112 represents the period in which the upper switch is conducting, while reference numeral 114 represents the period in which the lower solid state switch is non-conducting. It may be noted that the deadtime allows for the upper switch to be placed in a non-conducting state before the lower switch is shifted to a conducting state. Reference numeral 116, then, represents the period in which the upper solid state switch is a non-conducting state, while reference numeral 118 represents the period in which the lower solid state switch is in a conducting state. Here again, the deadtime allows for avoiding both switches conducting at the same time. These timing signals are then applied to gates to control the energization of the solid state switches in a conventional manner. It should be noted, however, that if the deadtime does not change, the value used for this parameter may be sent less often or upon initialization of the circuitry, and need not be sent repeatedly by the control circuitry. Moreover, if the deadtime is fixed, some embodiments may simply store the deadtime value in the power layer circuitry.

Figure 7:
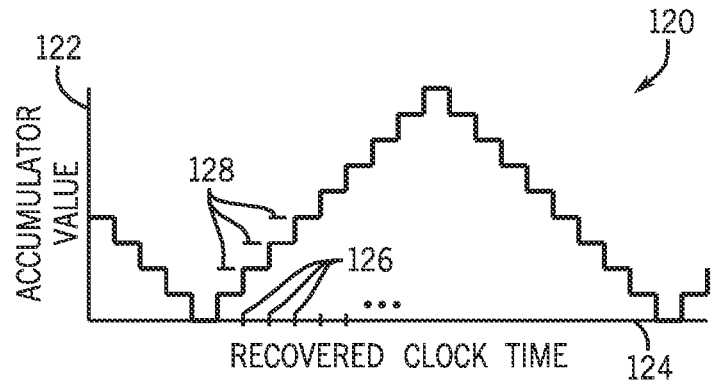
FIG. 7 is a graphical representation of clock recovery within the power circuitry following the signal timing illustrated in FIG. 6.

FIG. 7 represents an exemplary technique for recomputing the triangle waveform through the use of an accumulator in the power layer interface circuitry. The diagram of FIG. 7 illustrates a carrier waveform counter 120 that would correspond to the carrier wave 92 of FIG. 6. The counter waveform is illustrated as defined by an accumulator value 122 and a recovered clock time 124. The clock time is divided into time increments 126 and the carrier counter is then computed based upon an accumulated time step 128. The triangle increment for this carrier counter is transmitted from the control circuitry to the power layer circuitry of each inverter.

It should be noted that the signals transmitted from the control circuitry to the power layer circuitry of each inverter are sufficient to recompute the carrier wave and the timing signals, thus allowing each inverter, independently and in parallel, to recompute the timing signals with high fidelity. In a presently contemplated embodiment, for example, deviations between timing of the inverters does not exceed approximately 40 ns, and in certain embodiments may not exceed approximately 20 ns. Synchronization pulses may be sent periodically from the control circuitry to the power layer interface circuitry to re-establish synchronicity between the clocks. That is, in the event that the oscillators of the processors for the power layer interface circuitry do not operate at the same rates, any variation may be periodically (e.g., every 250 µs) corrected by the use of synchronization pulses. Nevertheless, the ability to recompute the timing signals at the power layer circuitry enables paralleling of the inverters while significantly reducing circulating currents.

Figure 8:
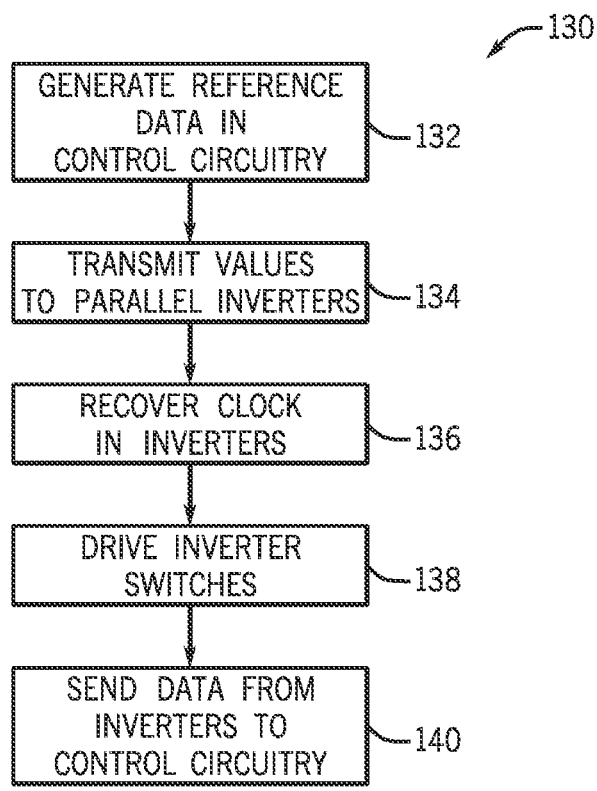
FIG. 8 is a block diagram illustrating exemplary logic for coordinating operation of the power circuitry in parallel drives.

FIG. 8 represents exemplary logic for carrying out these operations. The logic, designated generally by reference numeral 130 in FIG. 8, begins with generating reference data in the control circuitry, as indicated by step 132. This reference data will typically include the timing or data that can be used to compute the timing, including, in a present embodiment, the carrier triangle waveform increment, U, V, and W phase compare values, and a deadtime or delay value. As indicated at step 134, then, these values are transmitted in parallel to the inverters, and particularly to the power layer interface circuitry. As indicated at step 136, the clock timing is recovered in the inverters as indicated in FIG. 7, based upon the clock interval of the power layer interface circuitry and the triangle increments. At step 138, then, the timing signals are reconstructed in the power layer interface circuitry and pulse with modulated signals are generated for driving the solid state switches of each of the inverters. At step 140, signals may be sent from each inverter back to the control circuitry. As noted above, in a presently contemplated embodiment, such information may include U, V, and W phase currents, bus voltages, temperatures, false status, and so forth.

As noted above, the foregoing process allows for accurate synchronization of switching of parallel-coupled inverters having a common control circuit in common three-phase output. The waveform, or data used to recompute the waveform is generated by the control circuitry FPGA and is mirrored by identical waveforms in the power layer FPGAs. Such recomputation of the timing signals facilitates control task interrupt generation simplifies transmission of information between the control circuitry and the power layer circuitry, and allows for drive-to-drive synchronization (e.g., via IEEE-1588) where desired. Such drive-to-drive synchronization may be performed as disclosed in U.S. published patent application no. 20100123425, entitled "Motor Drive Synchronization System and Method," and filed by Campbell et al. on Nov. 17, 2008, which is hereby incorporated into the present disclosure by reference.

Figure 9:
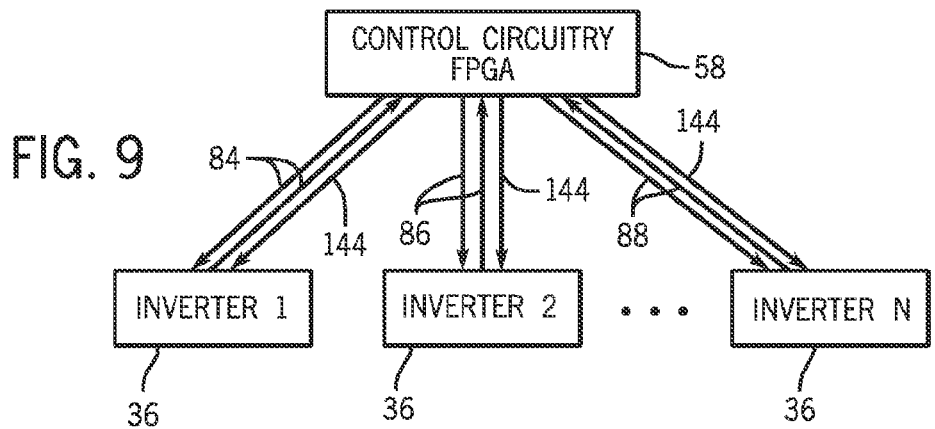
FIG. 9 is a diagrammatical representation of an alternative embodiment in which a clock signal conductor is provided for transmitting a clock signal.

In certain embodiments, it is also contemplated that a further optical conductor may be provided between the control circuitry and each power layer interface over which a clock signal could be transmitted. FIG. 9 illustrates diagrammatically a system of this type. As discussed above, each inverter 36 may be coupled to the control circuitry via parallel serial cables which include a pair of optical fibers. A third optical fiber 144 could be provided over which a clock signal is provided to each power layer interface from the control circuitry. The provision of this clock signal may obviate the need for clock recovery through recomputation of the triangular waveform as illustrated in FIG. 7. The recomputation of the timing signals could, thus, be performed in synchronicity based upon the transmitted clock signals.

While the foregoing techniques have been described in the context of parallel inverters, it should be noted that the same techniques could be used when controlling switching of a single inverter. That is, control circuitry could be adapted for generating timing signals or data from which timing signals can be derived. Data can be sent to a power layer interface for a single inverter that would, as discussed above, reconstruct the timing signals for changing the states of the solid state switches of the single inverter. In certain contexts, this could allow for simplification in product designs, product lines, modular power layers for inverters, modularity in programming of such circuitry, and so forth.

It should also be noted that, while particular techniques are disclosed herein for computation or recomputation of the timing signals used for driving the solid state switches of the inverters, other techniques may also be used. That is, information may be transmitted by the control circuitry to the power layer circuitry that permits switch timing to be established at the power layer circuitry by other algorithms.

Figure 10:
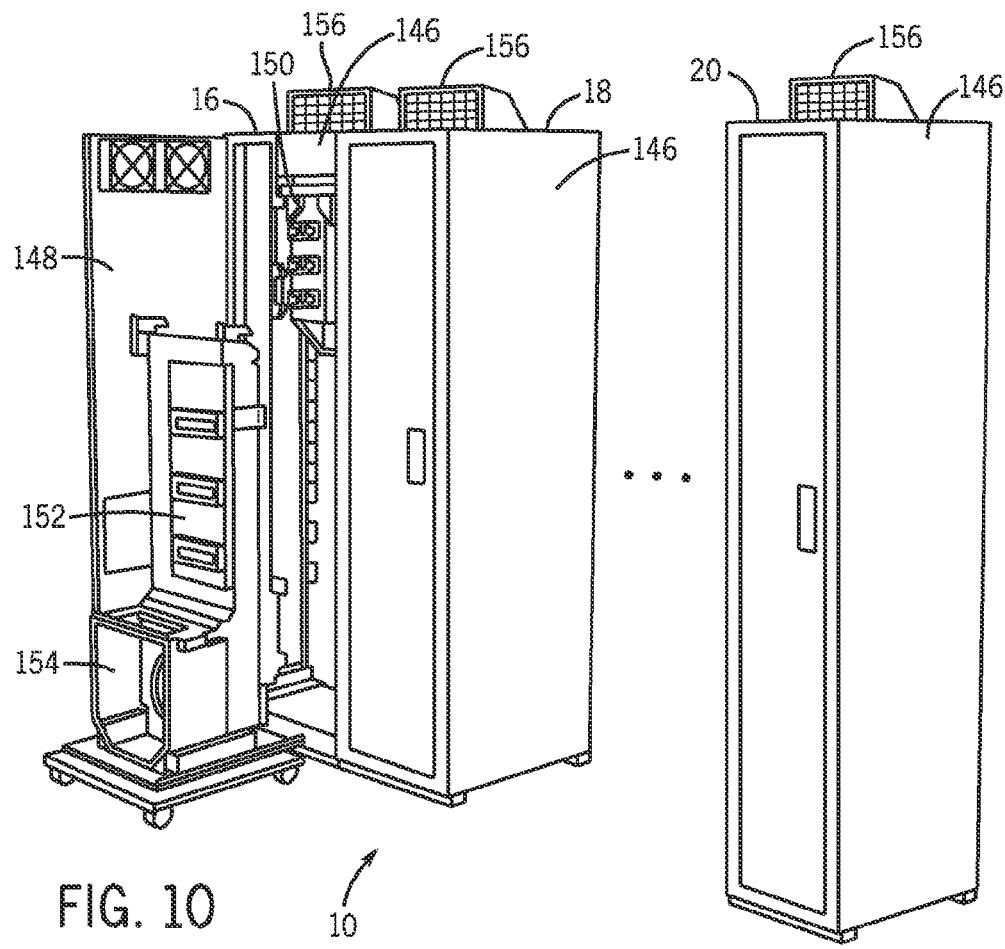
FIG. 10 is an exemplary physical representation of several parallel drive sections in a multiple-drive system.

FIG. 10 represents an exemplary embodiment of a multiple, parallel drive arrangement for a system of the type described above. In the implementation of FIG. 10, multiple modular electrical enclosures are provided that are joined to one another to form a common drive comprising several parallel drives 16, 18 and 20. The enclosures, designated generally by reference numeral 146 each have a door 148 which may be opened to access internal components of the respective parallel drive. As mentioned above, one of these may house the controller 22 which is coupled to the same drive and to other paralleled drives by optical fibers as described above. Within each drive a converter 150 is housed above an inverter 152. The particular arrangement of these circuits within the enclosure may be altered, but the illustrated embodiment has been found to allow for convenient combined or separate removal of the individual circuits for servicing, replacement, and the like. The converter is coupled to a line-side bus within each enclosure (not shown) for drawing power from the line for conversion to DC power which is conveyed to the respective inverter by DC bus conductors (not shown). Similarly, each inverter is coupled to a common load-side bus within the respective enclosure that provides outgoing power to the load. In addition to the enclosures illustrated in FIG. 10, separate enclosures may be provided for wiring connections, communications connections, and so forth. A blower 154 at the base of each section allows for cooling air to be circulated over heat sinks or other cooling components of the circuitry. This cooling air can be vented by a vent 156 at the top of each drive section.

Figure 11:
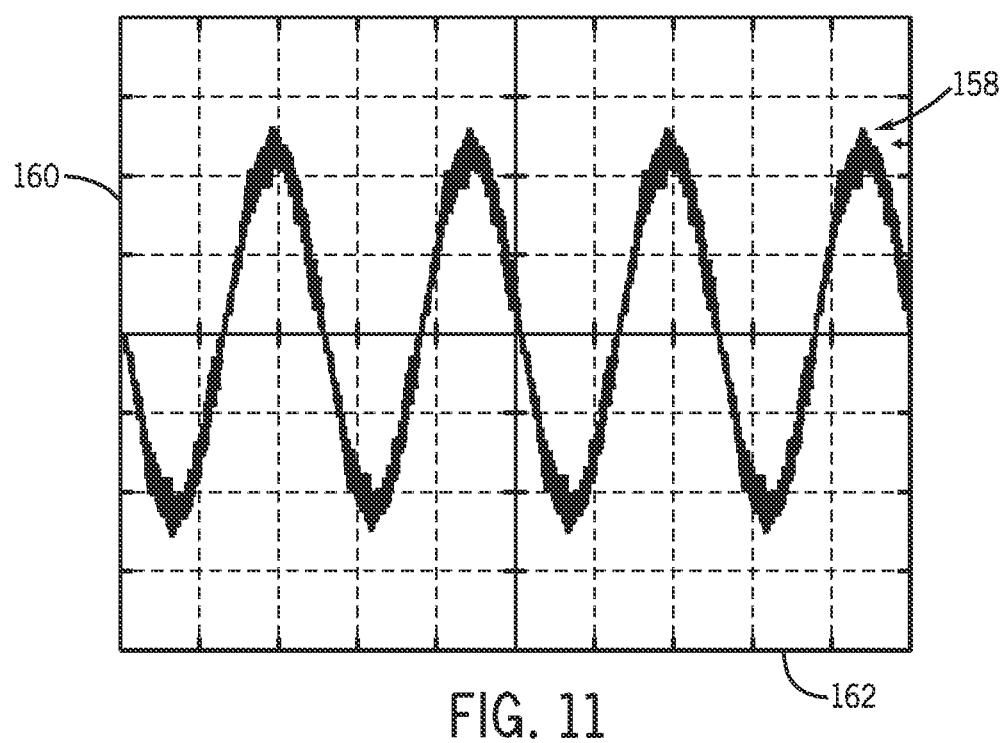
FIG. 11 is a graphical representation of current imbalance measurements for three such drive sections operating in parallel.
Figure 12:
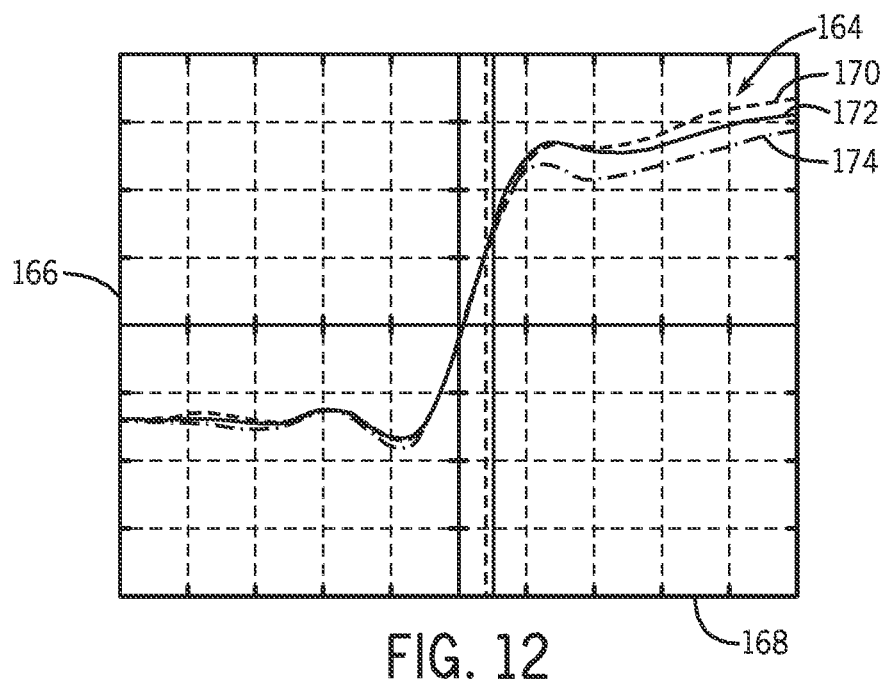
FIG. 12 is a graphical representation of turn-on gate drive synchronization measurements in the same arrangement.
Figure 13:
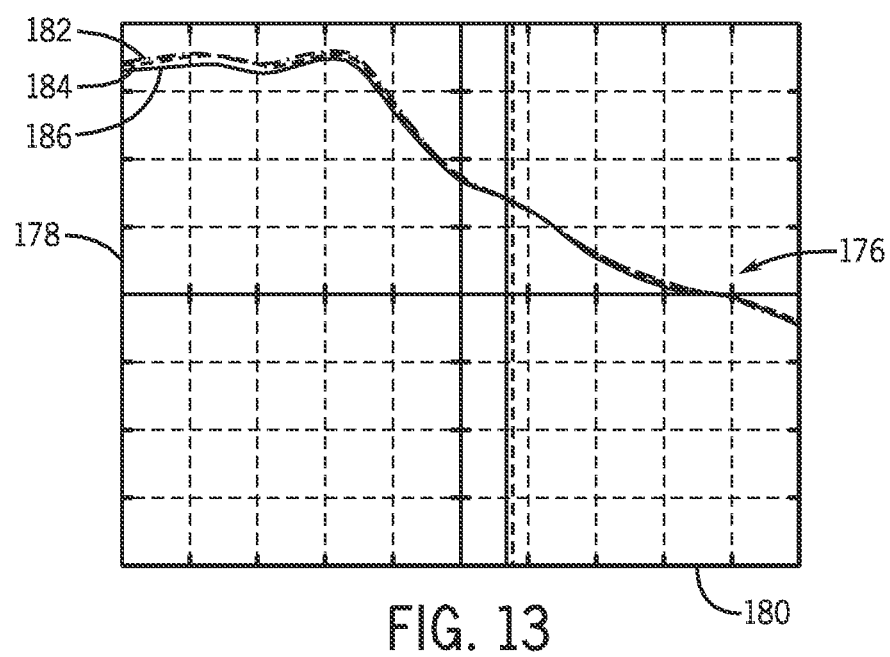
FIG. 13 is a graphical representation of turn-off gate synchronization measurements.

It has been found that the generation of the gate drive signals at the power layer of each drive, in parallel, allows for a high degree of synchronicity as illustrated in FIGS. 11, 12 and 13. In particular, FIG. 11 is a current trace 158 of the output current of three parallel drives operating as described above. The current trace is illustrated graphically with current magnitude along a vertical axis 160 and time along a horizontal axis 162. As can be seen from the diagram, the currents are superimposed with very little current imbalance measured between the output currents, resulting in extremely little circulating current.

FIG. 12 represents the switch turn-on gating synchronization measurements as indicated generally by reference numeral 164. In this diagram, the gate signals are represented along the horizontal axis 166 and time along the horizontal axis 168. Three gate drive signals 170, 172, 174 are illustrated showing excellent synchronicity in the turn-on timing between the drives. Similarly, the FIG. 13 represents switch gating synchronization measurements for turn-off, as indicated generally by reference 176. Here again, the gate drive signals are illustrated vertically as indicated by axis 178 against the time 180. Three turn-off signals 182, 184 and 186 are illustrated, again, with a high degree of synchronicity in the timing.

Moreover, it may be noted that the foregoing techniques effectively establish what may be termed a "master/slave" system and method for generating the gate drive signals used by the power layer circuitry. That is, the control circuitry generates the triangular carrier wave and determines the U, V, and W phase gate timing. Data needed for recomputation of this timing is sent to the power layer circuitry. This is true whether a single power layer is employed (for a single inverter) or multiple power layers (e.g., in the parallel arrangement described. When multiple parallel power layers are employed, the same data is sent to all power layers at the same time, and in parallel. The power layers, then, act as slaves, recomputing the timing based upon the same information. The use of synchronization pulses allows the power layers to remain synchronized with the control circuitry and with one another (the synchronization pulses effectively resetting counters in each of the power layers. The clock increments, then, are written to a waveform generator in the power layer, and the data is latched by an interrupt at each synchronization pulse.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electric motor drive system comprising:
a plurality of drive modules each comprising an inverter for converting DC power to controlled frequency AC power;
a shared load-side bus coupled to the inverters for combining the controlled frequency AC power from all of the drive modules into a common AC output; and
control circuitry coupled to all of the inverters and configured to provide signals to the inverters to permit each inverter to generate gate drive signals for power electronic switches of the respective inverter separately and in parallel with one another, the same gate drive signals being applied to the power electronic switches of all of the inverters.

2. The system of claim 1, wherein each inverter comprises power layer processing circuitry that, during operation, receives the signals from the control circuitry and generates timing for the gate drive signals based upon the received signals.

3. The system of claim 2, wherein the power layer processing circuitry of each inverter receives signals from the control circuitry sufficient for computing a carrier waveform and duty-cycles of the power electronic switches for three phases of output power.

4. The system of claim 3, wherein the signals from the control circuitry comprise a triangular carrier waveform increment, a deadtime, and output phase compare values.

5. The system of claim 1, wherein the control circuitry is coupled to the inverters via parallel optical cables.

6. The system of claim 5, wherein the optical cables have substantially the same length.

7. The system of claim 5, wherein the optical cables each include only 2 parallel optical fibers.

8. The system of claim 7, wherein one of the optical fibers is dedicated to transmission of data from the control circuitry to the respective inverter, and the other of the optical fibers is dedicated to transmission of data from the respective inverter to the control circuitry.

9. The system of claim 5, wherein the optical cables each include only 3 parallel optical fibers.

10. The system of claim 9, wherein a first of the optical fibers is dedicated to transmission of data from the control circuitry to the respective inverter, a second the other of the optical fibers is dedicated to transmission of data from the respective inverter to the control circuitry, and a third of the optical fibers is dedicated to providing a clock signal from the control circuitry to the respective inverter.

11. The system of claim 1, wherein the controlled frequency AC power from all of the drive modules is combined into a AC output directly via the shared load-side bus without interposition of inductive components therebetween.

12. An electric motor drive system comprising:
a plurality of drive modules each comprising an inverter for converting DC power to controlled frequency AC power;
control circuitry coupled to all of the inverters and configured to provide signals to the inverters to permit each inverter to generate gate drive signals for power electronic switches of the respective inverter separately and in parallel with one another;
parallel optical cables coupling the control circuitry is coupled to the inverters; and
a shared load-side bus coupled to the inverters for combining the controlled frequency AC power from all of the drive modules into a common AC output without interposition of inductive components therebetween;
wherein each inverter comprises power layer processing circuitry that, during operation, receives the signals from the control circuitry and generates timing for the gate drive signals based upon the received signals, the same gate drive signals being applied to the power electronic switches of all of the inverters.

13. The system of claim 12, wherein the control circuitry is coupled to the inverters via parallel optical cables of substantially equal length.

14. The system of claim 13, wherein the optical cables each include only 2 parallel optical fibers, one of the optical fibers being dedicated to transmission of data from the control circuitry to the respective inverter, and the other of the optical fibers being dedicated to transmission of data from the respective inverter to the control circuitry.

15. The system of claim 12, wherein the power layer processing circuitry of each inverter receives signals from the control circuitry sufficient for computing a carrier waveform and duty-cycles of the power electronic switches for three phases of output power.

16. The system of claim 15, wherein the signals from the control circuitry comprise a triangular carrier waveform increment, a deadtime, and output phase compare values.

17. An electric motor drive system comprising:
a plurality of drive modules each comprising an inverter coupled to the converter for converting DC power to controlled frequency AC power;
control circuitry coupled to all of the inverters and configured to provide signals to the inverters to permit each inverter to generate gate drive signals for power electronic switches of the respective inverter separately and in parallel with one another; and
a shared load-side bus coupled to the inverters for combining the controlled frequency AC power from all of the drive modules into a common AC output without interposition of inductive components therebetween;
wherein each inverter is coupled to the control circuitry via a respective optical cable and comprises power layer processing circuitry that, during operation, receives the signals from the control circuitry via the respective optical cable and generates timing for the gate drive signals based upon the received signals, the timing of the gate drive signals of any two of the inverters differing from one another by not more than 40 ns, the same gate drive signals being applied to the power electronic switches of all of the inverters.

18. The system of claim 17, wherein the optical cables each include only 2 parallel optical fibers, one of the optical fibers being dedicated to transmission of data from the control circuitry to the respective inverter, and the other of the optical fibers being dedicated to transmission of data from the respective inverter to the control circuitry.

19. The system of claim 17, wherein the power layer processing circuitry of each inverter receives signals from the control circuitry sufficient for computing a carrier waveform and duty-cycles of the power electronic switches for three phases of output power.

20. The system of claim 19, wherein the signals from the control circuitry comprise a triangular carrier waveform increment, a deadtime, and output phase compare values.

* * * * *